United States Patent [19]
Davis et al.

[11] Patent Number: 5,838,678
[45] Date of Patent: Nov. 17, 1998

[54] METHOD AND DEVICE FOR PREPROCESSING STREAMS OF ENCODED DATA TO FACILITATE DECODING STREAMS BACK-TO BACK

[76] Inventors: Joseph W. Davis, 2776 Peachtree Walk; Shawn M. Hayes, 1100 N. Court Dr., both of Duluth, Ga. 30136

[21] Appl. No.: 686,629

[22] Filed: Jul. 24, 1996

[51] Int. Cl.[6] ........................................ H04J 3/24
[52] U.S. Cl. ............................................. 370/389
[58] Field of Search ..................... 370/389, 493, 370/496, 498, 535, 536, 537, 538, 539, 540, 541, 542, 543, 474, 476, 477; 348/461, 462, 466, 467, 390, 395, 396, 394, 404, 409, 12, 13, 19, 607, 391, 400, 412, 384

[56] References Cited

U.S. PATENT DOCUMENTS 5,612,900  3/1997  Azadegan et al. .................. 364/514 R
5,623,424  4/1997  Azadegan et al. .................. 364/514 R

*Primary Examiner*—Dang Ton
*Attorney, Agent, or Firm*—Sawyer & Associates

[57] ABSTRACT

A method and device for preprocessing streams of encoded data (e.g. compressed in accordance with an MPEG standard) to permit a decoder to decode the streams, back-to-back (i.e., one stream immediately following another), without being reset and without producing video artifacts. The present invention includes verifying that a multiplexed stream complies with an encoding standard and preprocessing packets of the packetized encoded video sequence such that no video artifacts are produced when a video decoder decodes an adjacent encoded video sequence.

17 Claims, 16 Drawing Sheets

| | | No. of bits | Mnemonic |
|---|---|---|---|
| video_sequence0 {                                                                              300 | | |
|    next_start_code0 | | |
|    sequence_header0                                  302 | | |
|    if (nextbits0 = extension_start_code) { | | |
|       sequence_extension0                          304 | | |
|       do { | | |
|          extension_and_user_data(0)          306 | | |
|          do { | | |
|             if (nextbits0 = group_start_code) { | | |
| 308                group_of_pictures_header0 | | |
| 310                extension_and_user_data(1) | | |
|             } | | |
| 312                picture_header0 | | |
| 314                picture_coding_extension0 | | |
| 316                extensions_and_user_data(2) | | |
| 318                picture_data0 | | |
|          } while ( (nextbits0=picture_start_code) \|\| | | |
|                  (nextbits0 = group_start_code) ) | | |
|          if (nextbits0! = sequence_end_code) { | | |
|             sequence_header0 | | |
|             sequence_extension0 | | |
|          } | | |
|       } while(nextbits0!=sequence_end_code) | | |
|    } else { | | |
|       /*ISO/IEC 11172-2 */ | | |
|    } | | |
|    sequence_end_code                                320 | 32 | bslbf |
| } | | |

FIG. 3B
(PRIOR ART)

| sequence_header0 {                     | 302 | No. of bits | Mnemonic |
|----------------------------------------|-----|-------------|----------|
| sequence_header_code                   | 402 | 32          | bslbf    |
| horizontal_size_value                  |     | 12          | uimsbf   |
| vertical_size_value                    |     | 12          | uimsbf   |
| aspect_ratio_information               |     | 4           | uimsbf   |
| frame_rate_code                        |     | 4           | uimsbf   |
| bit_rate_value                         | 404 | 18          | uimsbf   |
| marker_bit                             |     | 1           | bslbf    |
| vbv_buffer_size_value                  |     | 10          | uimsbf   |
| constrained_parameters_flag            |     | 1           |          |
| load_intra_quantiser_matrix            |     | 1           |          |
| if(load_intra_quantiser_matrix)        |     |             |          |
|    intra_quantiser_matrix[64] |     | 8 *64       | uimsbf   |
| load_non_intra_quantiser_matrix        |     | 1           |          |
| if (load_non_intra_quantiser_matrix)   |     |             |          |
|    non_intra_quantiser_matrix[64] |     | 8 *64       | uimsbf   |
| next_start_code0                       |     |             |          |
| }                                      |     |             |          |

FIG. 4
(PRIOR ART)

| picture_header0 {                                         312 | No. of bits | Mnemonic |
|---|---|---|
| picture_start_code                                        502 | 32 | bslbf |
| temporal_reference                                        504 | 10 | uimsbf |
| picture_coding_type | 3 | uimsbf |
| vbv_delay | 16 | uimsbf |
| if(picture_coding_type = 2 \|\| picture_coding_type = 3) { | | |
| full_pel_forward_vector | 1 | |
| forward_f_code | 3 | uimsbf |
| } | | |
| if (picture_coding_type = 3) ( | | |
| full_pel_backward_vector | 1 | |
| backward_f_code | 3 | uimsbf |
| } | | |
| while (nextbits0 = '1') { | | |
| extra_bit_picture  /* with the value '1' */ | 1 | uimsbf |
| extra_information_picture | 8 | |
| } | | |
| extra_bit_picture  /* with the value '0' */ | 1 | uimsbf |
| next_start_code0 | | |
| } | | |

FIG. 5 (PRIOR ART)

| group_of_pictures_header0 {                               308 | No. of bits | Mnemonic |
|---|---|---|
| group_start_code          604 | 32 | bslbf |
| time_code | 25 | bslbf |
| closed_gop                602 | 1 | uimsbf |
| broken_link | 1 | uimsbf |
| next_start_code0 | | |
| } | | |

FIG. 6 (PRIOR ART)

| Syntax | No. of bits | Mnemonic |
|---|---|---|
| TS_program_map_section0 { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number —1102 | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for(i=0; j<N; i++) { | | |
|         description0 | | |
|     } | | |
|     for (i=0; i<N1; i++) { | | |
|         stream_type | 8 | uimsbf |
|         reserved | 3 | bslbf |
|         elementary_PID —1104 | 13 | uimsnf |
|         reserved | 4 | bslbf |
|         ES_info_length | 12 | uimsbf |
|         for (i=0; i<N2; i++) { | | |
|             description0 | | |
|         } | | |
|     } | | |
|     CRC_32 | 32 | rpchof |
| ) | | |

FIG. 11
(PRIOR ART)

| At encoder input 1602 | 1 | 2 | 3 | 4 | 5 | 6 | 7 | 8 | 9 | 10 | 11 | 12 | 13 |
|---|---|---|---|---|---|---|---|---|---|---|---|---|---|
| | I | B | B | P | B | B | P | B | B | I | B | B | P |
| At encoder output 1604 | 1 | 4 | 2 | 3 | 7 | 5 | 6 | 10 | 8 | 9 | 13 | 11 | 12 |
| | I | P | B | B | P | B | B | I | B | B | P | B | B |
| At decoder output 1606 | 1 | 2 | 3 | 4 | 5 | 6 | 7 | 8 | 9 | 10 | 11 | 12 | 13 |
| | I | B | B | P | B | B | P | B | B | I | B | B | P |

FIG. 16

METHOD AND DEVICE FOR PREPROCESSING STREAMS OF ENCODED DATA TO FACILITATE DECODING STREAMS BACK-TO BACK

BACKGROUND OF THE INVENTION a. Field of the Invention

The present invention generally concerns the transmission and decoding of encoded data, such as MPEG (Motion Pictures Expert Group) or MPEG II encoded data for example. In the following, MPEG and/or MPEG II will be referred to simply as "MPEG". In particular, the present invention concerns preprocessing streams of encoded data to permit the streams to be decoded back-to-back (i.e., one stream immediately following another).

b. Related Art

The MPEG standard focuses on the encoding and transport of video and audio data. In general, the MPEG standard uses compression algorithms such that video and audio data may be more efficiently stored and communicated.

The International Organization for Standardization (or the Organization International De Normalisation) (hereinafter referred to as "the ISO/IEC") has produced the MPEG II standard for the coding of moving pictures and associated audio. This standard is set forth in four documents. The document ISO/IEC 13818-1 (systems) specifies the system coding of the specification. It defines a multiplexed structure for combining audio and video data and means of representing the timing information needed to replay synchronized sequences of the audio and video data in real-time. The document ISO/IEC 13818-2 (video) specifies the coded representation of video data and the decoding process required to reconstruct pictures. The document ISO/IEC 13818-3 (audio) specifies the coded representation of audio data and the decoding process required to reconstruct the audio data. Lastly, the document ISO/IEC 13818-4 (conformance) specifies procedures for determining the characteristics of coded bitstreams and for testing compliance with the requirements set forth in the ISO/IEC documents 13818-1, 13818-2, and 13818-3. These four documents, hereinafter referred to, collectively, as "the MPEG II standard" or simply "the MPEG standard", are incorporated herein by reference.

A bit stream, multiplexed in accordance with the MPEG standard, is either a "transport stream" or a "program stream". Both program and transport streams are constructed from "packetized elementary stream" (or PES) packets and packets containing other necessary information. A "packetized elementary stream" (or PES) packet is a data structure used to carry "elementary stream data". An "elementary stream" is a generic term for one of (a) coded video, (b) coded audio, or (c) other coded bit streams carried in a sequence of PES packets with one and only stream ID. Both program and transport streams support multiplexing of video and audio compressed streams from one program with a common time base.

Transport streams permit one or more programs with one or more independent time bases to be combined into a single stream. Transport streams are useful in instances where data storage and/or transport means are lossy or noisy. The rate of transport streams, and their constituent packetized elementary streams (PESs) may be fixed or variable. This rate is defined by values and locations of program clock reference (or PCR) fields within the transport stream.

FIG. 14 illustrates the packetizing of compressed video data 1406 of a video sequence 1402 into a stream of PES packets 1408, and then, into a stream of transport stream packets 1412. Specifically, a video sequence 1402 includes various headers 1404 and associated compressed video data 1406. The video sequence 1402 is parsed into variable length segments, each having an associated PES packet header 1410, to form a PES packet stream 1408. The PES packet stream 1408 is then parsed into segments, each of which is provided with a transport stream header 1414 to form a transport stream 1412. Each transport stream packet of the transport stream 1412 is 188 bytes in length.

Although the syntax of the transport stream and transport stream packets is described in the MPEG II standard, the fields of the transport stream packet pertaining to the present invention will be described below with reference to FIG. 1 for the reader's convenience. As shown in FIG. 1, a transport stream 100 (shown as 1412 in FIG. 14) includes one or more 188 byte transport stream packets, each of the transport stream packets having a header 102 (shown as 1414 in FIG. 14) and an associated payload 104.

Each header 102 (or 1414) includes an eight (8) bit sync byte field 106, a one (1) bit transport error indicator field 108, a one (1) bit payload unit start indicator field 110, a one (1) bit transport priority field 112, a thirteen (13) bit packet identifier (or PID) field 114, a two (2) bit transport scrambling control field 116, a two (2) bit adaptation field control field 118, a four (4) bit continuity counter field 120, and an optional adaptation field 122. Each of these fields is described in the MPEG II standard. However, for the reader's convenience, the fields particularly relevant to the present invention are described below.

First, the sync byte 106 has a value of "01000111" (or 47 hex) and identifies the start of a 188 byte transport stream packet. The PID field 114 indicates the type of data stored in the payload 104 of the 188 byte transport stream packet. Certain PID values are reserved. The continuity counter field 120 counts the number of consecutive transport stream packets having the same PID field 114 value.

As shown in FIG. 1, the adaptation field 122 includes an eight (8) bit adaptation field length field 124, a one (1) bit discontinuity indicator field 126, a one (1) bit random access indicator field 128, a one (1) bit elementary stream priority indicator field 130, a five (5) bit flag field 132, optional fields 134 and stuffing bytes 136. The discontinuity indicator field 126 is set to "1" to indicate (a) a system time-base discontinuity or (b) continuity counter discontinuities.

As is further shown in FIG. 1, the optional fields 134 include a 42 bit program clock reference (or PCR) field, 138, a 42 bit original program clock reference (or OPCR) field 140, an eight (8) bit splice countdown field 142, an eight (8) bit transport private data length field 144, a transport private data field 146, an eight (8) bit adaptation field extension length field 148, a three (3) bit flag field 150, and optional fields 152. Each of these fields is described in the MPEG II standard. However, for the reader's convenience, the fields particularly relevant to the present invention are described below.

First, the 42 bit program clock reference (or PCR) field 138 and the 42 bit original program clock reference (or OPCR) field 140 are time stamps in the transport stream from which timing of a downstream decoder is derived. The eight (8) bit transport private data length field 144 describes the length (in bytes) of the adjacent transport private data field 146. The contents of the transport private data field 146 are privately determined (i.e., not specified by the ISO/IEC).

As is also shown in FIG. 1, the optional fields 152 include a one (1) bit legal time window valid flag field 154, a fifteen

(15) bit legal time window offset field 156, two (2) undefined bits, a 22 bit piecewise rate field 158, a four (4) bit splice type field 166, and a 33 bit decoding time stamp next access unit field 162. A description of these fields is not necessary for understanding the present invention.

The payloads 104 of one or more transport stream packets may carry "packetized elementary stream" (or PES) packets. To reiterate, a "packetized elementary stream" (or PES) packet is a data structure used to carry "elementary stream data" and an "elementary stream" is a generic term for one of (a) coded video, (b) coded audio, or (c) other coded bit streams carried in a sequence of EPES packets with one and only stream ID.

FIG. 2 is a diagram which illustrates the syntax of a PES packet 200. As FIG. 2 shows, a EPES packet 200 includes a 24 bit start code prefix field 202, an eight (8) bit stream identifier field 204, a sixteen (16) bit PES packet length field 206, an optional PES header 208, and a payload section 210. Each of these fields is described in the MPEG II standard. However, for the reader's convenience, the fields particularly relevant to the present invention are described below.

The sixteen (16) bit PES packet length field 206 specifies the number of bytes in the PES packet 200 following this field 206. A value of 0 in this field 206 indicates that the PES packet length is neither specified nor bounded. Such an unspecified and unbounded PES packet 200 is only allowed in PES packets whose payload is a video elementary stream contained in transport stream packets. As can be deduced from the description of the PES packet length field 206, the PES packet 200 can be much longer (e.g., 4000 bytes) than the length of the payload 104 of a 188 byte transport stream packet. Thus, a PES packet 200 is typically carried in consecutive payloads 104 of a series of transport stream packets. (See e.g., FIG. 14).

Referring back to FIG. 2, the optional PES header 208 may include optional fields 212. The optional fields 212 include a 33 bit PTS and DTS field. The PTSs (or Presentation Time Stamps) indicate the times of presentation in a system target decoder of a presentation unit of an elementary stream.

The payload 210 of a PES packet 200 may carry a sequence of video frames or audio frames, for example. FIGS. 3a and 3b illustrate the high level organization of a video bitstream (or video sequence) 300 in accordance with the MPEG II standard. As shown in FIGS. 3a and 3b, the video bitstream (or video sequence) 300 includes a sequence header 302, which may be followed by a sequence extension field 304. The sequence extension field 304 may be followed by an extension and user field 306, which may be followed by a group of picture header 308, and optionally, another extension and user field 310. In any event, a picture header 312 follows the sequence extension field 304 (in addition to any of the other fields). A picture coding extension field 314 follows the picture header field 312. An optional extension and user field 316 follows. Next, the picture data 318 is provided. More sequences may be provided. Otherwise, the video sequence 300 is ended with a sequence end code 320. Each section of the video sequence 300 is described in the MPEG II standard. However, for the reader's convenience, the sections particularly relevant to the present invention are described below As shown in FIG. 4, the sequence header 302 includes a 32 bit sequence header code field 402 and an eighteen (18) bit rate value field 404. The sequence header code field 402 is 000001B3 hex and identifies the beginning of a sequence header. The bit rate value field 404 identifies the bit rate of the video bitstream measured in units of 400 bits/second. A twelve (12) bit rate extension field may be included in the extension and user field 310. Repeating the sequence header in the video bitstream allows data elements of the initial sequence header to be repeated to permit random access into the video sequence.

As shown in FIG. 5, the picture header 312 includes a 32 bit picture start code field 502, as well as a ten (10) bit temporal reference field 504. The temporal reference field 504 is a unsigned integer associated with each input picture. This integer is incremented by one, modulo 1024, for each input frame. If a frame is coded as two interleaved fields, the temporal reference 504 in the picture header 312 of both fields is the same. Following a group start code 604 in the group of pictures header 308, the temporal reference field 504 is reset to zero.

FIG. 7 is a high level block schematic showing a system for encoding, communicating, and decoding video and audio data in accordance with the MPEG II standard.

As shown in FIG. 7, video data is provided to a video encoder 702 which encodes the video data in accordance with the MPEG II standard (specified in the document ISO/IEC 13818-2 (video), which is incorporated herein by reference). The video encoder 702 provides encoded video 704 to a packetizer 706 which packetizes the encoded video 704. The packetized encoded video 708 output by the packetizer 706 is then provided to a first input of a program stream multiplexer 710 and/or a transport stream multiplexer 712. For the purposes of understanding the present invention, it can be assumed that program streams are not generated.

Similarly, audio data is provided to an audio encoder 714 which encodes the audio data in accordance with the MPEG II standard (specified in the document ISO/IEC 13818-3 (audio), which is incorporated herein by reference). The audio encoder 714 provides encoded audio 716 to a packetizer 718 which packetizes the encoded audio 716. The packetized encoded audio 720 output by the packetizer 718 is then provided to a second input of the program stream multiplexer 710 and/or the transport stream multiplexer 712.

The transport stream multiplexer 712 multiplexes the encoded audio and video packets to form a transport stream 100 and provides the transport stream 100 to communications link 722. At a remote end of the communications link 722, a transport stream demultiplexer 724 receives the multiplexed transport stream 100.

Based on the packet identification (or PID) number 114 of a particular packet, the transport stream demultiplexer 724 separates the encoded audio and video packets and provides the video packets to a video decoder 730 via link 728 and the audio packets to an audio decoder 734 via link 732. The transport stream demultiplexer 724 also provides timing information to a clock control unit 726. The clock control unit 726 provides timing inputs to the both the video decoder 730 and the audio decoder 734 based on the timing information provided by the transport stream demultiplexer 724. The video decoder 730 provides decoded video data which corresponds to the video data originally provided to the video encoder 702. Similarly, the audio decoder 734 provides decoded audio data which corresponds to the audio data originally provided to the audio encoder 714.

As mentioned above, transport streams 100 permit one or more programs with one or more independent time bases to be combined into a single stream. That is, a transport stream 100 may include a first program and a second program. In presently contemplated systems, both the video decoder 730 and the audio decoder 734 must be reset before decoding a next program, for reasons which will be explained below. Thus, for example, in such systems there must be a temporal gap (e.g., one second) between the decoding of the first and second programs to permit the video and audio decoders 730 and 734, respectively, to be reset. This temporal gap precludes the playing of the second program directly following the first program. Moreover, it is difficult to determine when one program ends and another begins in real-time. Thus, a method and/or a device is needed to permit more than one program to be played (i.e., decoded) back-to-back. The method and/or device should also overcome, or avoid, the difficulties of determining program boundaries in real-time.

The resetting of the decoders between programs is necessary in view of the following. MPEG and MPEG II video encoding converts a video signal to a compressed, digital signal. As mentioned above, such encoding is desirable because less space is needed to store such encoded data, and less bandwidth is needed to transmit such encoded data. Additionally, the use of digital data permits more error free and robust storage and transmission.

Basically, the MPEG and MPEG II video encoding schemes are based on the fact that in many instances, frames of video, particularly adjacent frames of video, include redundant (or static) information. For example, in a newscast, the set is static. Indeed, the newscaster is often relatively static except for their head. The MPEG and MPEG II video encoding schemes exploit this fact by using three different types of frames; namely (i) bi-directionally predictive coded pictures, (ii) predictive coded pictures, and (iii) intra-coded pictures. The bi-directionally predictive coded pictures (or "B-Pictures") provide the highest degree of compression but require both past and future reference pictures for decoding. Predictive coded pictures (or "P-Pictures") are less compressed than B-Pictures, but only require a past reference picture. Lastly, intra-coded pictures (or "I-Pictures") are coded without reference to other pictures, but are coded with only moderate compression. Since the I-Pictures do not need other frames for decoding, I-Pictures are used to provide random access and recovery from errors. I-Pictures are also used at scene cuts or other instances where motion compensation is ineffective. The organization (i.e., sequence) of the three picture types is not specified by the MPEG II standard.

Thus, as can be appreciated from the above discussion of MPEG and MPEG II video encoding, the video decoder 730 often needs past and future frames to decode a picture (B-Picture) frame. If the last temporal (displayed) frame of a first program is used in decoding a first temporal (displayed) frame of a second program, or if a partial video frame is used, the output of the video decoder 730 will have been improperly decoded, disadvantageously causing video artifacts. Thus, as discussed above, the decoders must be reset between programs in known systems.

To reiterate, a method and/or a device is needed to permit more than one program to be played (i.e., decoded) back-to-back.

SUMMARY OF THE INVENTION

The present invention, provides a method and a device for permitting more than one program (e.g., a commercial advertisement) to be played (i.e., decoded) back-to-back. Specifically, the present invention provides a method for preprocessing multiplexed streams of packets of packetized, encoded, audio and video sequences such that an audio decoder can decode the encoded audio sequence to produce an audio sequence and a video decoder can, without being reset, decode the encoded video sequence to produce a video sequence. The method of the present invention (i) verifies that the multiplexed stream complies with an encoding standard, (ii) preprocesses packets of the packetized, encoded, video sequence such that no video artifacts are produced when the video decoder decodes an adjacent encoded video sequence, and (iii) preprocesses the packets of the packetized, encoded, audio data sequence such that its start time is within a first predetermined time of the start time of the video sequence and its temporal length is within a second predetermined time of the temporal length of the video sequence.

The step of preprocessing the packets of the packetized, encoded, video sequence preferably includes (i) deleting any video frames that cannot be decoded if video frames of the video sequence are not temporally correct, and (ii) deleting any video frames following a code indicating an end of the encoded video sequence. The step of preprocessing the packets of the packetized, encoded, audio sequence preferably includes (i) removing any partial audio frames, (ii) adjusting (i.e., adding or deleting) the number of audio frames, if necessary, such that the audio and video sequences start within the first predetermined time, and (iii) adjusting (i.e., adding or deleting) the number of audio frames, if necessary, such that the temporal lengths of the audio and video sequences are within the second predetermined time.

More specifically, the present invention provides a method for preprocessing files including multiplexed streams of packets of packetized, compressed (in accordance with an MPEG standard for example), audio and video sequences such that a video decoder can, without being reset, decode packets of the packetized, compressed, video sequence immediately following packets of another packetized, compressed, video sequence. The method does so by (i) verifying that a file complies with a compression (e.g., an MPEG) standard, (ii) adding a private data packet to the file, (iii) remapping packet identifiers of the packets of packetized, compressed, audio and video sequences, (iv) determining whether the packets of the packetized, compressed, video sequence pass a first set of tests, (v) deleting certain frames of the compressed video sequence if the packets of the packetized, compressed, video sequence were not determined to have passed the first set of tests, (vi) determining whether packets of the packetized, compressed, audio sequence, corresponding to the compressed video sequence, pass a second set of tests, and (vii) adjusting the number of (i.e., adding or deleting) frames the compressed audio sequence if the packets of the packetized, compressed, audio sequence were not determined to have passed the second set of tests.

In a preferred embodiment of the present invention, the step of verifying includes (i) determining whether the file has a predetermined number of sync bytes located 188 bytes apart, (ii) determining whether a first packet of the multiplexed stream has a PCR discontinuity flag set, (iii) determining whether PTS and DTS fields exist before the compressed video sequence, (iv) determining whether a PTS field exists before the compressed audio sequence, (v) determining whether the compressed video sequence begins with a sequence header, (vi) determining whether picture data of the video sequence starts with an I-Picture frame, and/or (vii) determining whether a first group-of-pictures of the compressed video sequence is closed.

In a preferred method of the present invention, a private data packet containing a source ID field, a bit rate field, a video frame count, and/or a version field is added to the file.

A preferred method of the present invention determines whether frames of compressed video sequence are temporally correct and, if they are not temporally correct, deletes frames of video data from the compressed video sequence until temporal correctness is restored. This preferred method also determines whether any frames of the video sequence follow a code which indicates an end of the compressed video sequence and deletes frames of video data from the compressed video sequence following the code.

A preferred method of the present invention determines whether any partial audio frames exist in the compressed audio sequence, and removes any partial audio frames in the compressed audio sequence. It also determines whether the audio and video sequences start within a first predetermined time, and adjusts (i.e., adds or deletes) the number of audio frames in the compressed audio sequence until the start time of the audio sequence is within the first predetermined time of the start time of the video sequence. Lastly, the preferred method determines whether the audio sequence has a temporal length within a second predetermined time of a temporal length of the video sequence and adjusts the number of (i.e., acids or deletes) audio frames in the compressed audio sequence until the temporal length of the audio sequence is within the second predetermined time of the video sequence.

In a preferred method of the present invention, the private data packet is updated. Specifically, the video frame count is modified to reflect any video frames deleted from the compressed video sequence.

The device of the present invention converts a transport stream file of MPEG encoded audio and video data to a preprocessed transport stream file of MPEG encoded audio and video data such that a video decoder can decode two consecutive preprocessed streams of the MPEG encoded video data without being reset. The device of the present invention includes a storage device, a program storage, a controller, a preprocessor, a buffer memory, and an input/output interface. The storage device stores transport stream files and preprocessed transport stream files. The program storage device stores a sequence of instructions which are executed by the controller to control access to the transport stream files and the preprocessed transport stream files in the storage device. The preprocessor, under control of the controller, reads a transport stream file from the storage device, converts the read transport stream file into a preprocessed transport stream file, and writes the preprocessed transport stream file to the storage device. The buffer memory reads a preprocessed transport stream file from the storage device under control of the controller and buffers the read preprocessed transport stream file. The input/output interface (such as a SCSI or SCSI-2 fast and wide interface for example) formats the preprocessed transport stream buffered in the buffer memory for output to the decoder. A communications network is arranged between the input/output interface and the decoder.

BRIEF DESCRIPTION OF THE DRAWINGS

FIGS. 3a and 3b illustrate the organization of an MPEG II video sequence.

FIG. 4 illustrates the structure of a sequence header of the MPEG II video sequence of FIGS. 3a and 3b.

FIG. 5 illustrates the structure of a picture header of the MPEG II video sequence of FIGS. 3a and 3b.

FIG. 6 illustrates the structure of a group of pictures header of the MPEG II video sequence of FIGS. 3a and 3b.

FIG. 11 is a table which illustrates the syntax of a program map table.

FIG. 16 is a chart which illustrates an example of the ordering of various types of compressed picture frames at various stages of encoding video, transmitting an MPEG stream, and decoding.

DETAILED DESCRIPTION

In the following, the term "MPEG" is intended to refer to either the MPEG standard, the MPEG II standard, or both.

The preprocessing method and preprocessor of the present invention (i) avoid the need to determine program boundaries in real time; and (ii) permit two programs (such as commercial advertisements for example) to be decoded back-to-back.

Figure 8:
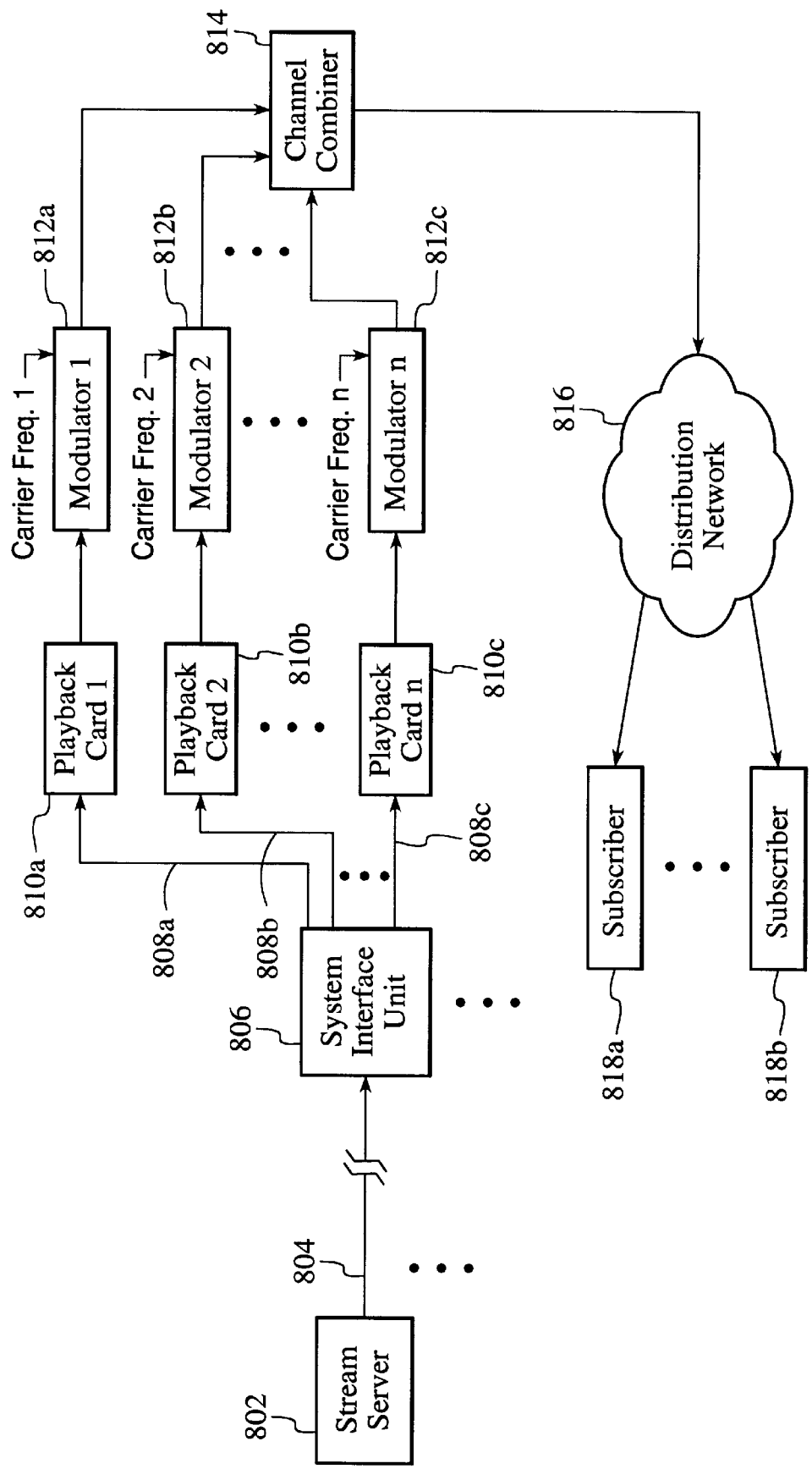
FIG. 8 is a high level block diagram of an operating environment in which the method and device of the present invention may be used.

FIG. 8 is a high level block diagram of an operating environment of which the method and device of the present invention may be a part. A stream server 802 provides one or more programs, (e.g., commercial advertisements) including MPEG encoded audio and video data encapsulated in transport stream packets, to a system interface unit 806 via communications link 304. Although only one system interface unit is shown, a plurality of M system interface units 806 may be provided to the stream server 802. The system interface unit 806 buffers the incoming program data and provides it to an appropriate one of N playback cards 810, via a corresponding link 808. Each of the playback cards 810, inter alia, (i) demultiplexes the transport stream, (ii) provides the appropriate encoded data to video and audio decoders, (iii) converts the decoded video to a standard (e.g., NTSC) video signal, (iv) synchronizes the decoded video with a network feed, and (v) switches an appropriate one of (a) the network feed or (b) the converted and decoded video to its output based on cuetone signals in the network feed. Alternatively, a playback card 810 may combine an external video source (e.g., network feed) with the decoded video.

In each of the playback cards 810, an output is provided to an associated modulator 812 which modulates the output signal with a unique carrier frequency. The outputs of the modulators 812 are provided to a channel combiner 814 which combines these narrowband signals to produce a broadband signal. The broadband signal output by the channel combiner 814 is provided, via a distribution network 816, such as a coaxial cable distribution network for example, to subscribers 818.

A back channel (not shown) from each playback card 810 to the stream server 802, via a system interface card 806, may also be provided. This back channel may be used to communicate verification information, buffer state information, and audio volume information, for example, from the playback cards 810 to the stream server 802. The back channel may be a low band width communications link, such as 10 BaseT (Ethernet) for example. Alternatively, back channel communications may be sent, from the playback cards 810 to the stream server 802, over the same communications links 808 and 804 used to carry transport stream(s) from the server 802 to the playback cards 810.

The stream server 802 may be a workstation (executing a stored program) such as a Silicon Graphics Challenge DM or Challenge S server for example. The stream server 802 should include (1) a processor (or processors) having adequate processing speed for processing the packets, for responding to control signals, and for providing indicator signals (e.g., 100 MHz R4600 or 150 MHz R4400 CPUs); (2) an adequate amount of memory to store audio, video, and private application data being processed (e.g., 32 MBytes to 2 GBytes of RAM); and (3) a system bus having adequate throughput (e.g., 267 MBytes to 1.2 GByte bandwidth). The stream server 802 should also include appropriate input/output ports and interfaces (e.g., Ethernet, SCSI, SCSI-2 fast and wide, FDDI, and others) for accepting the packetized data, for transmitting the transport stream, and for accepting and providing appropriate control and indicator signals. The communications link 804, over which the transport stream is communicated, may be sufficient to support the SCSI-2 fast and wide protocol, for example.

The preprocessing of the MPEG encoded data with the device of the present invention in accordance with the method of the present invention preferably takes place at the stream server 802. Theoretically, the preprocessing can take place downstream from the stream server 802 before the transport stream is demultiplexed. However, preprocessing downstream from the stream server 802 would be cost prohibitive because such preprocessing would have to be done in real-time. Further, performing the preprocessing at the stream server 802 is advantageous since such preprocessing must then only be performed once. In the following description of the present invention, it is assumed that the preprocessing is performed at the stream server 802.

Figure 9:
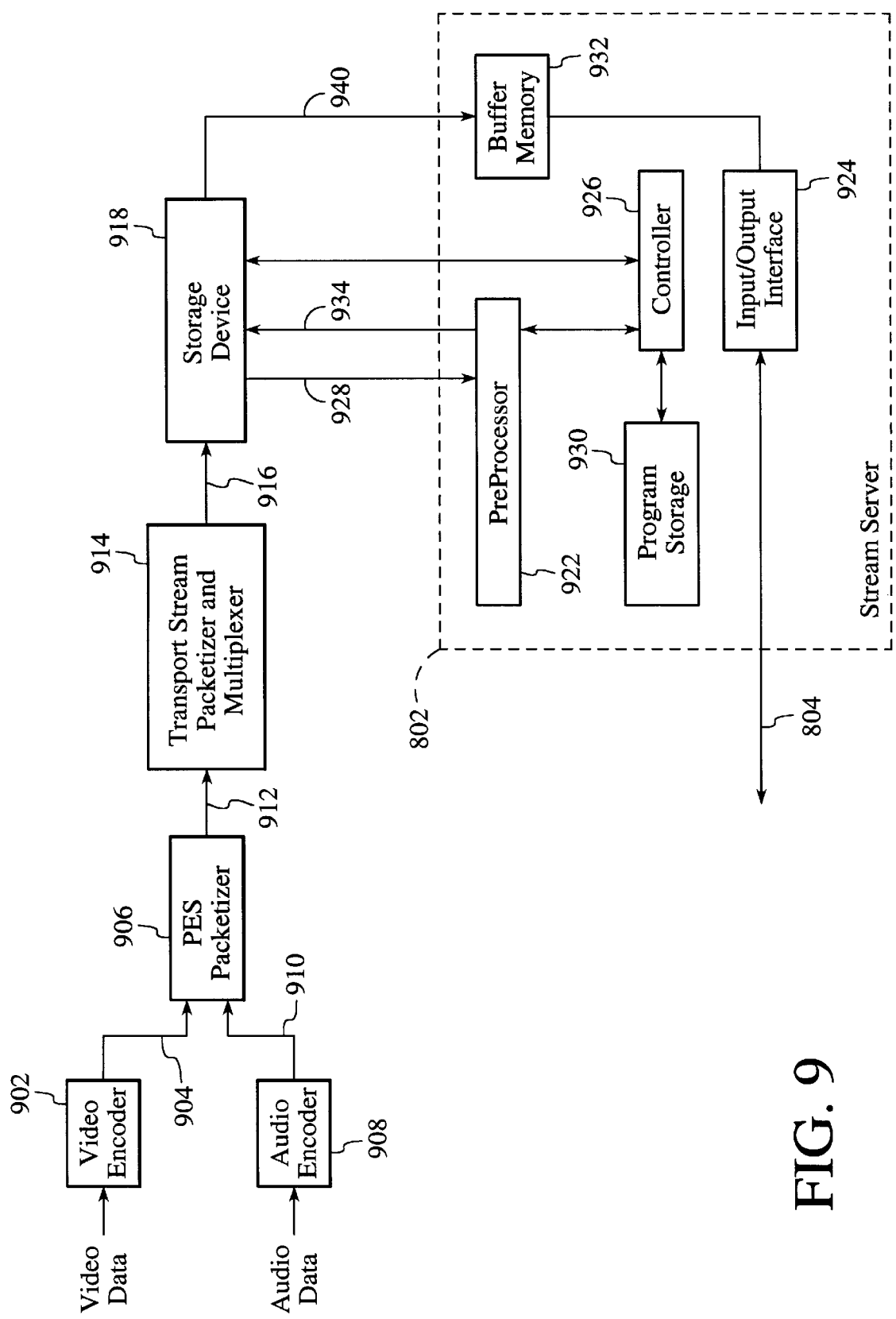
FIG. 9 is a block diagram which includes the stream server of FIG. 8.

As shown in FIG. 9, the stream server 802 includes, inter alia, a preprocessor 922, an input/output (e.g., SCSI-2 fast and wide) interface 924, a controller 926, a buffer memory 932, and a program storage 930. The processing of audio and video data before its application to the stream server 802 is described below.

Video data is encoded based on a compression algorithm, such as the MPEG standard for example, with a video encoder 902. The encoded video sequence 904 is then applied to a packetizer 906, such as a PES packetizer for example. Similarly, audio data is encoded based on an encoding algorithm, such as the MPEG standard for example, with audio encoder 908. The encoded audio sequence 910 is also applied to the packetizer 906.

The packetizer 906, encapsulates the video sequence into one or more packets and encapsulates the audio sequence into one or more packets, such as FES packets for example. The PES packets of audio and video sequences 912 are then applied to a transport stream packetizer and multiplexer 914 which packetizes the PES packets into the payloads 104 of 188 byte transport stream packets and multiplexes the transport stream packets to form a transport stream. (See e.g., FIG. 14.) The transport stream 916 is then provided to a storage device 918 where it is stored, along with other transport streams, in files.

The stream server 802 includes a controller 926, such as a microprocessor for example, which can execute a "load media" routine stored in program storage 930. When executing the "load media" routine, the controller 926 instructs the storage device 918 to provide a particular transport stream file(s) 928 to the stream server 802, and in particular, to the preprocessor 922. The controller 926 then instructs the preprocessor 922 to preprocess the transport stream file(s) 928. After preprocessing the transport stream file(s) 928, the preprocessed transport stream file(s) 934 are written back to the storage device 918.

Upon receiving an appropriate control signal, such as a decoded queue-tone sent from a playback card 810 via a backchannel for example, a requested preprocessed transport stream file(s) 940 is read from the storage device 918 to the buffer memory 932 under control of the controller 926. The preprocessed transport stream file(s) 940, along with a few extra private packets located before and after the preprocessed transport stream file(s), is then sent to a system interface unit 806 via input/output (e.g., SCSI-2 fast and wide) interface 924 and communications link 804.

The private data packets are inserted into the buffer memory 932 by the controller 926 before, after, or within the preprocessed transport stream file(s) 940. These private data packets may, for example, signify the start or end of a break, or may help synchronize the transport demultiplexer of a playback card 810 with the transport stream. The start or end of a break may be identified by a unique packet identifier (or PID) 114 or a unique bit sequence at the start of a payload 104 of a transport stream packet.

Figure 1:
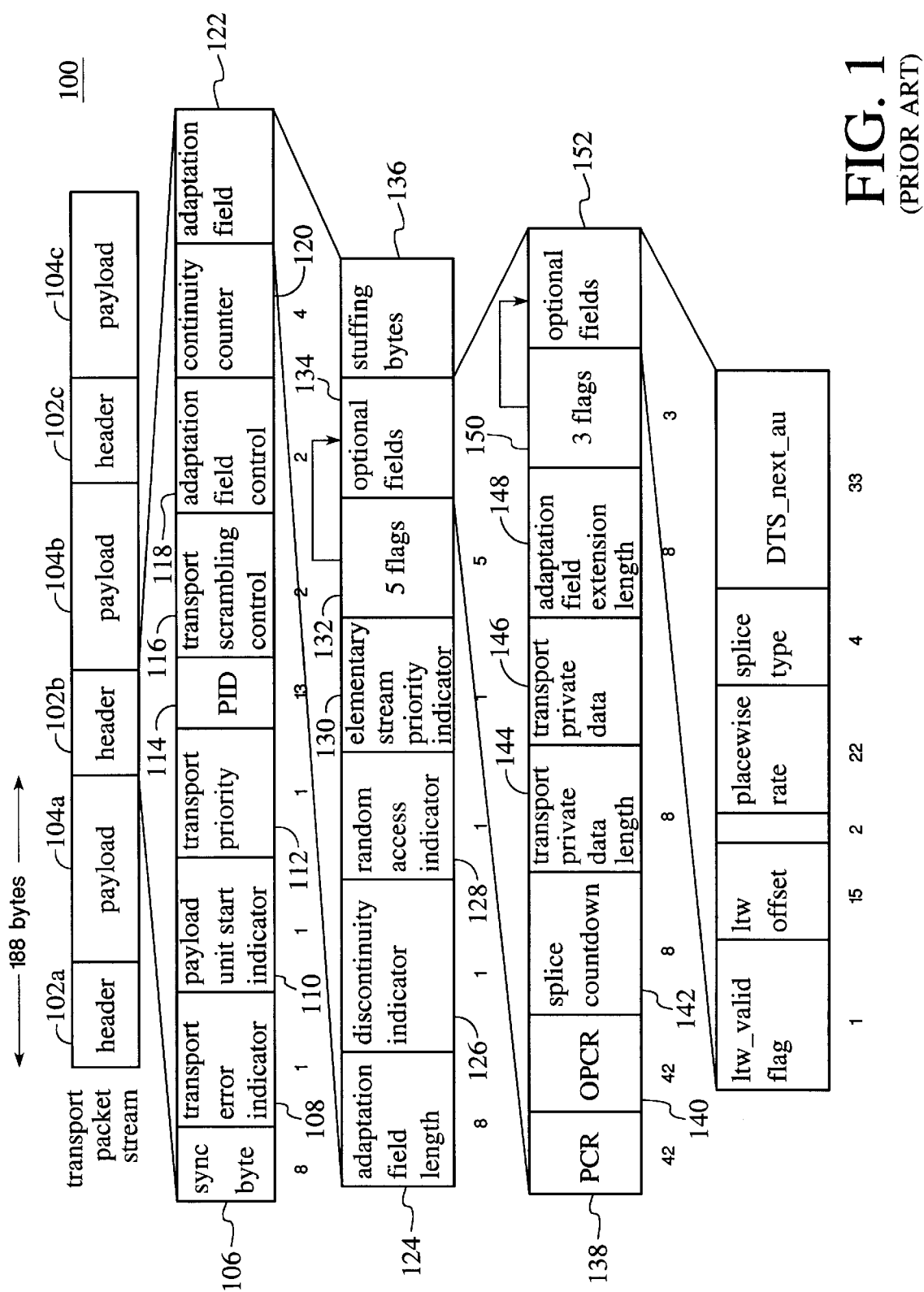
FIG. 1 is a diagram which illustrates the syntax of an MPEG II transport stream and an MPEG II transport stream packet.
Figure 2:
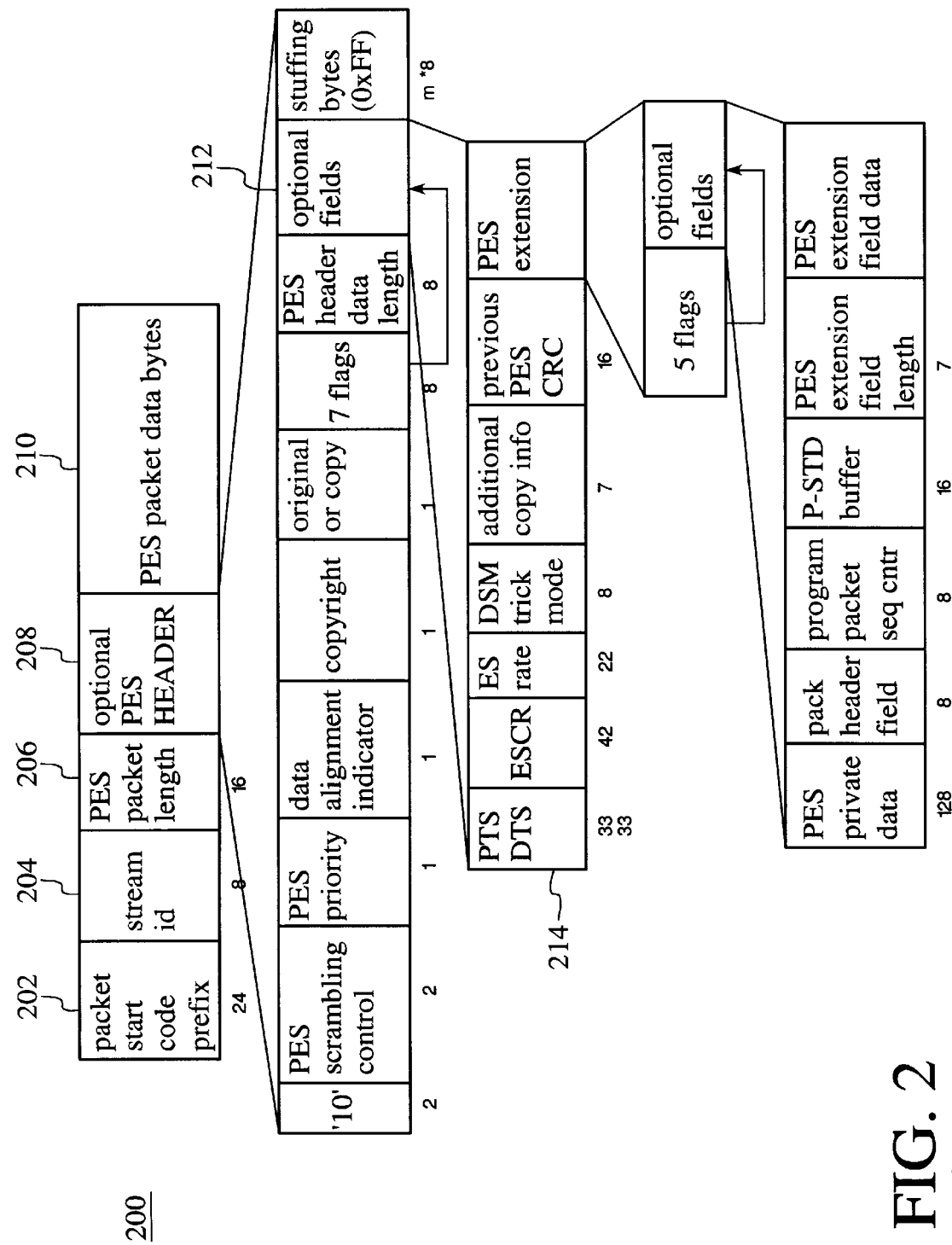
FIG. 2 is a diagram which illustrates the syntax of an MPEG II PES packet.
Figure 10:
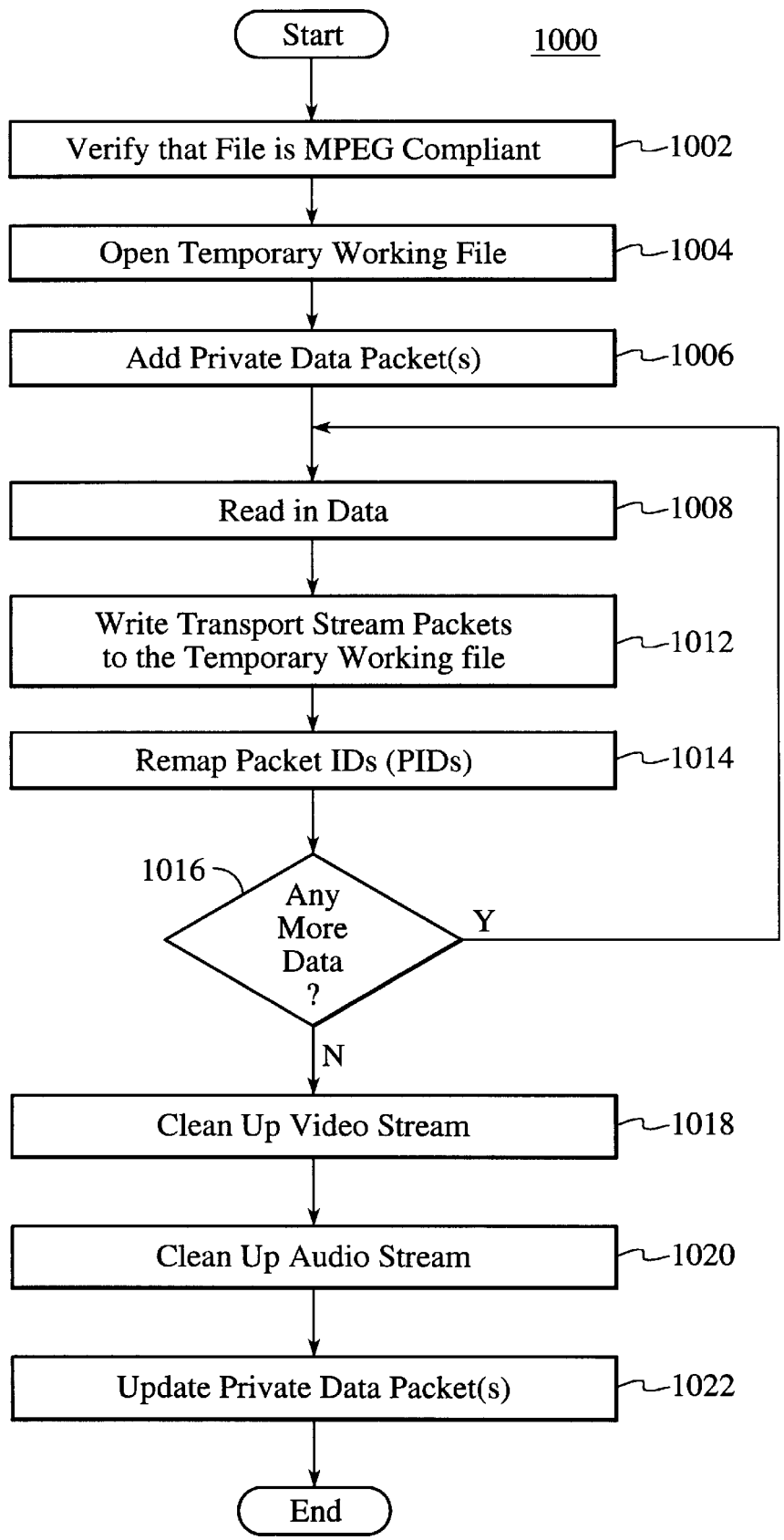
FIG. 10 is a flow diagram of the method of the present invention.

FIG. 10 is a flow diagram illustrating the preprocessing method 1000 of the present invention. As discussed above with reference to FIG. 9, the preprocessor 922 is given a transport stream file 928 to process. First, as shown in step 1002, the preprocessing method verifies that the file is an MPEG file, i.e., is MPEG compliant. Referring back to FIG. 1, recall that a transport stream includes 188 byte packets. The preprocessor 922 of the present invention uses this fact to check whether the file contains a predetermined number (e.g., five (5)) of consecutive sync bytes 106 (hex 47) located 188 bytes apart.

Further, to be MPEG compliant, the file must also contain a program association table (or PAT). Basically, the program association table (or PAT) lists program(s) to be contained in a stream and associates a program number with the PID(s) (which is (are) privately defined) of a program map table (or PMT). The program association table (or PAT) is carried in the payload 104 of one or more transport stream packets 100 and is identified by a reserved PID number, "0X000", in the PID field 114 of the header(s) 102 of the transport stream packet(s) 100.

The program map table (or PMT) maps program numbers with the elementary streams that comprise them. More specifically, as shown in FIG. 11, which illustrates the syntax of a program map table (or PMT), the program map table (or PMT) includes a sixteen (16) bit program_number field 1102 and one or more thirteen (13) bit elementary_PID fields 1104. The program_number field 1102 may be used to designate broadcast channels, for example. The elementary- PID field(s) specify the PID(s) of the transport stream packets which carry the associated elementary stream or payload.

Furthermore, the first transport stream packet with a PCR must have its discontinuity indicator 126 set to be MPEG compliant, as there is a high likelihood that a PCR discontinuity will occur. When set, the discontinuity indicator 126 instructs the downstream decoder to resynchronize its clocks to the new stream. The preprocessor 922 can set the discontinuity indicator 126.

Figure 3A:
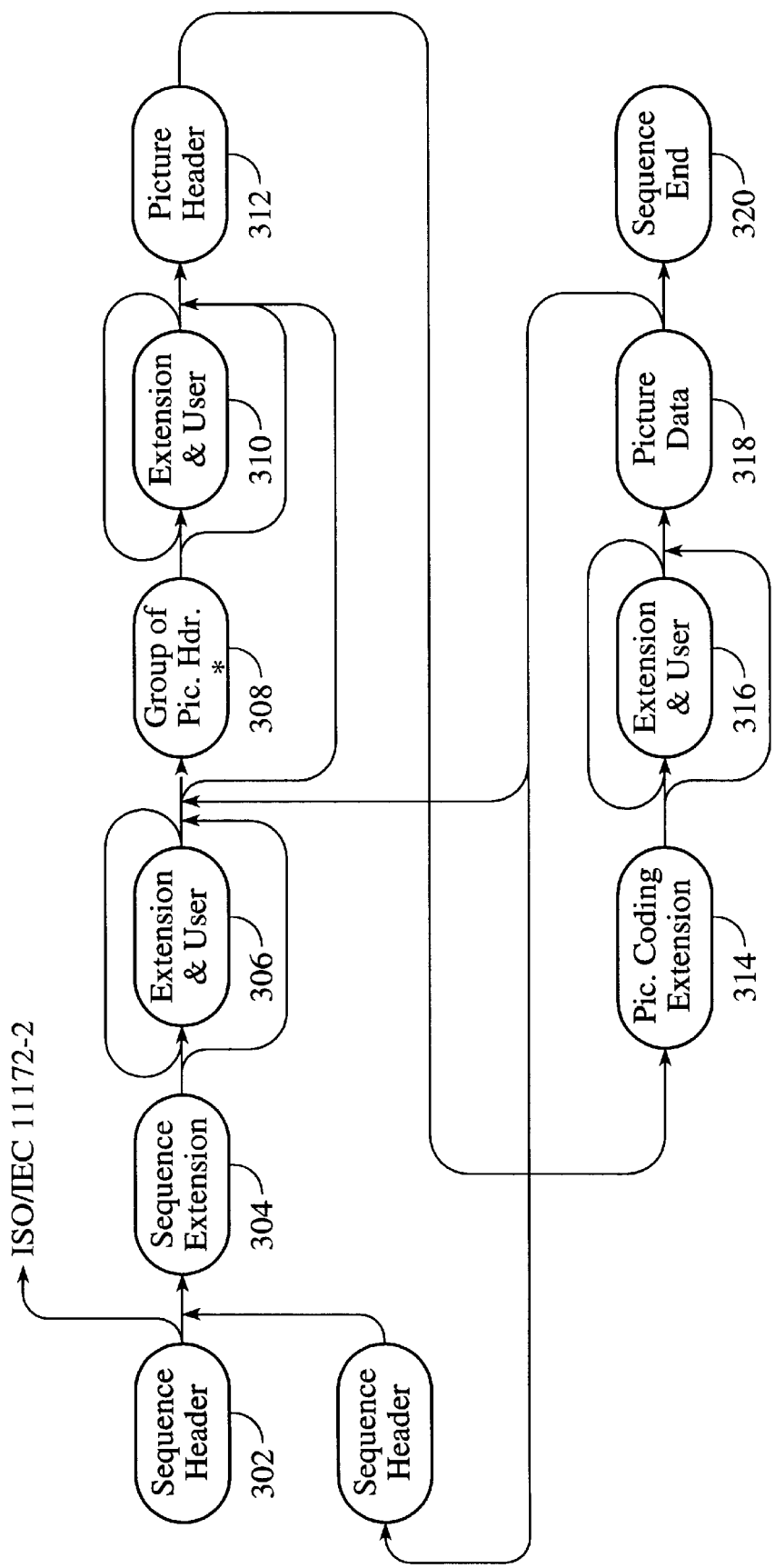
Figure 7:
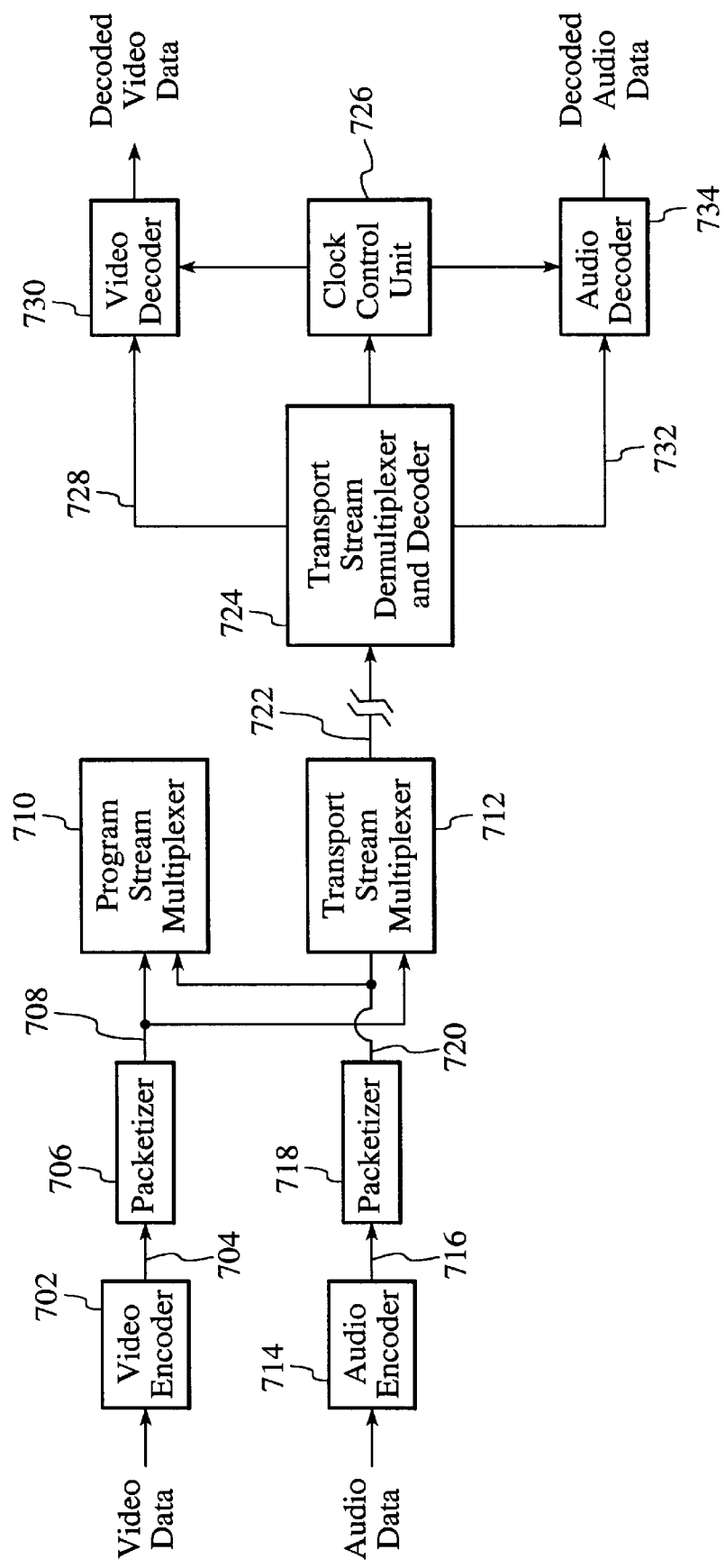
FIG. 7 illustrates an encoding, transmission, and decoding system envisioned by MPEG II.
Figure 14:
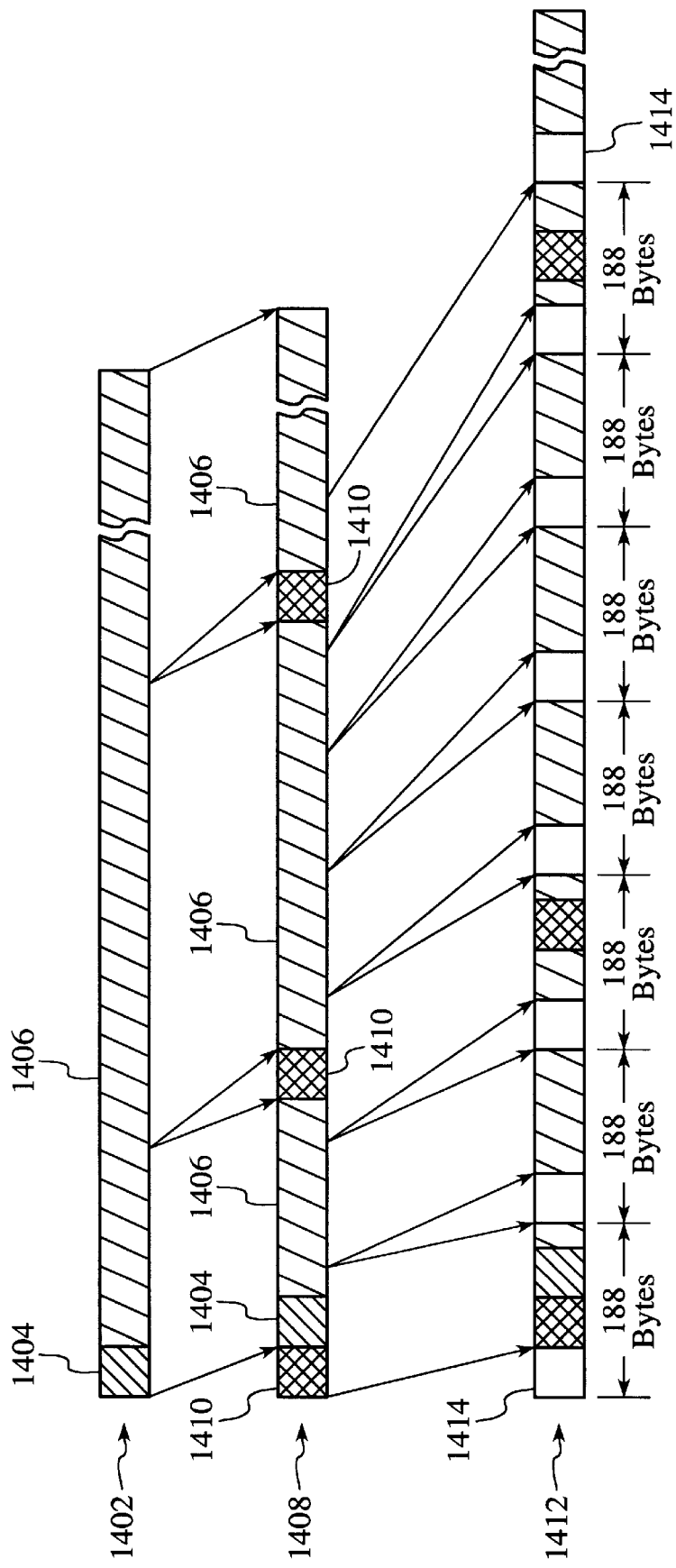
FIG. 14 illustrates packetizing a video sequence into PES packets, and then, into transport stream packets.

Also, a PTS/DTS field 214 must exist before any actual video elementary stream, and a PTS field 214 must exist before any audio elementary stream, since the video and audio sequences are packetized into PES packet(s) as shown in FIG. 14. Additionally, the video elementary stream must begin with a sequence header 302 as shown in FIGS. 3a and 3b. The picture data 318 of the video sequence 300 must start with an I-Picture frame since B-Picture and P-Picture frames require additional frames for decoding. (See e.g., sequence 1602 of FIG. 16.) The first group-of-pictures must be "closed" due to how picture frames are decoded. Specifically, given a video sequence that (as displayed) starts with the sequence BBI (see e.g., temporal frames 8, 9, and 10 of sequences 1602 and 1606 of FIG. 16.), if the B-Picture frames are encoded based solely on the I-Picture frame, then they can be decoded without any artifacts using backward only prediction. That is, as shown in FIG. 16, the B-Picture frames are decoded with an I-Picture frame that precedes them in the transmission order but that follows them in the display (or temporal) order. If, on the other hand, the B-Picture frames are encoded based on the I-Picture frame and a previous reference frame (P or I), then, when the B-Picture frames are decoded, the decoder will utilize the I-Picture frame in the current stream (or Group of Pictures) and a reference frame from the previous stream (or Group of Pictures), resulting in video artifacts. The preprocessor 922 checks whether the first group-of-pictures is closed by checking for the closed GOP flag 602 in the Group of Pictures header 308 (See FIG. 6.) in the video elementary stream.

Lastly, the audio length in time and video length in time must be the same (or within some margin). By examining the PTS associated with the first audio frame and video frame, the preprocessor can determine whether the frames are in sync. If the audio PTS is more than an audio frame time ahead of the video frame, then audio frame(s) are removed until the first audio and video frames start within a frame time of each other. A similar process is followed at the end of the file.

Next, as shown in step 1004, a temporary working file is opened. Then, as shown in step 1006, a private data packet (s) is added. The private data packet(s) should include, inter alia, a source ID field, a bit rate field, a video frame count field, and a version field.

The source ID field identifies the source of the private data packet. When the private data packet(s) is introduced by the preprocessor, the source ID has a first value. However, private data packet(s) can be produced elsewhere in the system of FIG. 8.

The bit rate field sets a constant bit rate at which the transport stream (including audio PES streams, video PES streams, and program specific information (or "PSI") data) should be fed to a playback card 810. The value of the bit rate field can be based on (i) the frame rate at which the video is to be displayed, (ii) the file size, and (iii) the frame count. The frame rate is derived from a standard, such as the NTSC (or National Television Standards Committee) for example. The file size is determined by means of a system call by the preprocessor 922. The frame count is determined based on the number of picture headers 312 in the video sequence.

The video frame count field, which is also based on the number of picture headers 312 in the video sequence, may be used to verify that the stream was completely decoded and displayed by a playback card 810. The video frame count can be considered an approximate program run time. For example, a 30 second program will have about 899 video frames at the NTSC frame time of 1/29.97 seconds per frame.

The version field indicates the version of preprocessor 922 (or preprocessor software) being used. The version field is useful because later preprocessor versions, which may include additional preprocessing steps, can determine whether all of, or only some of, the preprocessing steps must be performed on the stream. Thus, the version field may facilitate a faster updated preprocessing.

The private data packet(s) may also include (i) an initial video PTS/DTS, (ii) an initial audio PTS, (iii) relative audio volume characteristics (especially if performing auto-leveling) for the beginning and end of the program (e.g., commercial advertisement) for left, right, and secondary audio program (or "SAP") components of the audio signal, and (iv) verification and error recovery aids such as file size, checksum, CRC, etc.

The above mentioned contents of the private data are preferably only derived for relatively short programs, such as commercial advertisements for example. For longer programs, such as a two-hour movie for example, determining the values of these fields may become impractical.

Next, as shown in steps 1008 and 1012, the packets of the transport stream file(s), having transport stream packetized and PES packetized encoded video and audio data are read in and written to a temporary working file.

As shown in step 1014, as the preprocessor reads the file, it uses data obtained from the program map table (or PMT) to remap the audio and video packet IDs (or PIDs) so that they correspond to conventions used in a transport stream demultiplexer located in a playback card 810. For example, the transport stream demultiplexer located in the playback card 810 may interpret a PID of 100 hex to indicate that the transport stream packet includes video data and a PID of 200 hex to indicate that the transport stream packet includes audio data.

As shown in step 1016, steps 1008, 1012, and 1014 are repeated until all data from the transport stream file are read into the temporary working file. When all data from the file are read, the video and audio streams are "cleaned up" as shown in steps 1018 and 1020, respectively. The video and audio "clean up" steps 1018 and 1020, respectively, are described with reference to FIGS. 12 and 13, respectively.

Figure 12:
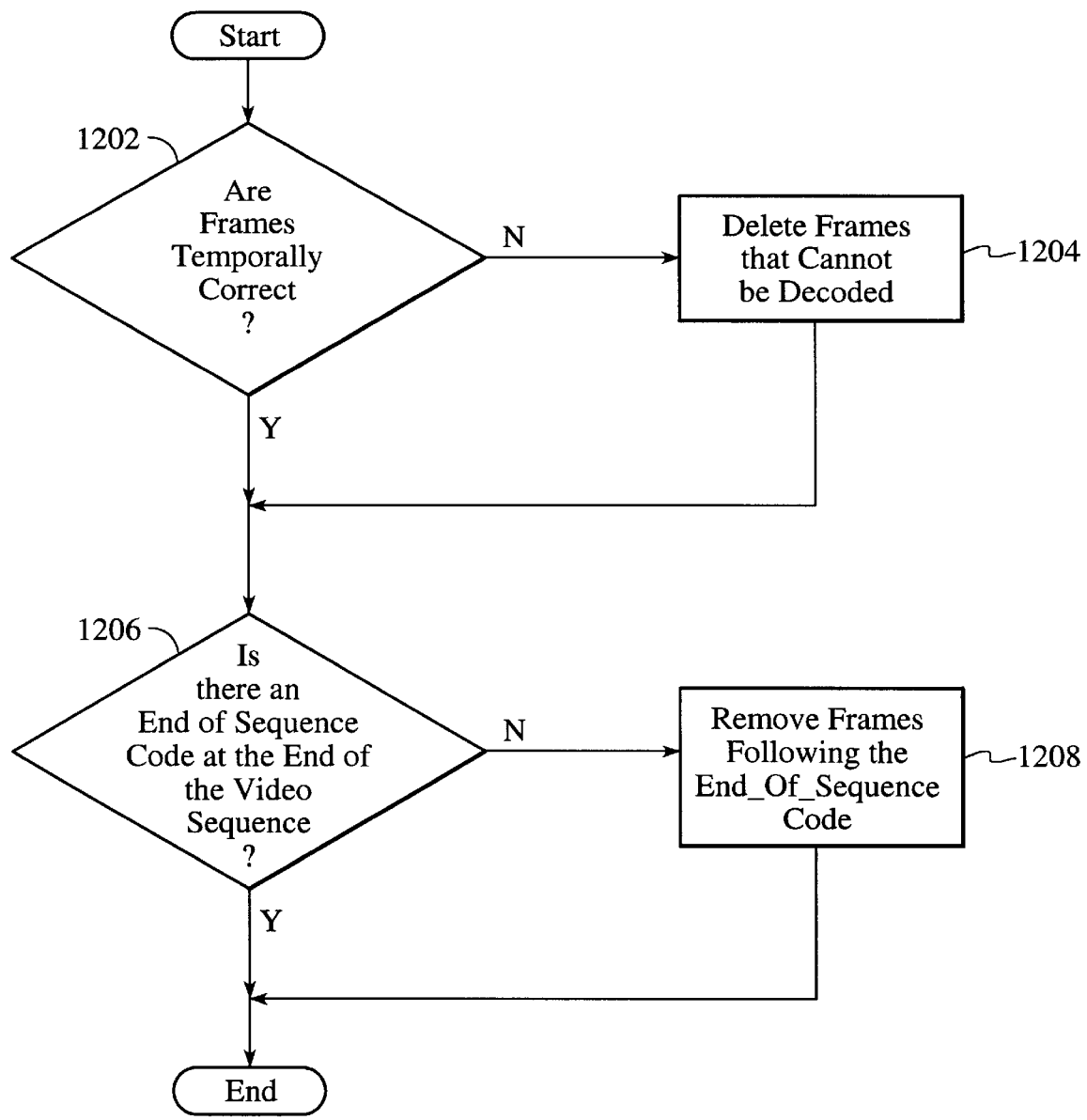
FIG. 12 is a flow diagram illustrating the step, used in the method of the present invention, of cleaning up the video stream.

FIG. 12 is a flow diagram showing a process for "cleaning up" the video stream. This process basically performs two functions; namely (i) removing video frames that cannot be decoded due to a lost frame(s) destroying temporal correctness, and (ii) removing video frames following an end_of_sequence code such that an end_of_sequence code appears at the end of the video stream. The need for each of these functions is briefly explained below.

When a video frame is lost, temporal correctness is often destroyed. In such instances, one or more frames cannot be properly decoded and video glitches result. The temporal order of frames stored on a disk (See e.g., 918 of FIG. 9) is not the same as the order of the display of the frames. For example, FIG. 16 shows the ordering of I-Pictures, P-Pictures, and B-Pictures before encoding 1602, after encoding but before decoding (e.g., during storage and transport) 1604, and after decoding 1606. Recall that a ten (10) bit temporal_reference field 502 is included in the picture header of the video sequence. (See FIG. 5.) In this example, the second and third (B-Picture) frames are decoded only after the first (I-Picture) and fourth (P-Picture) frames are received. Thus, if the fourth (P-Picture) frame is lost, the second and third (B-Picture) frames cannot be decoded and would be removed to ensure that all frames are complete. Thus, as shown in step 1202, the temporal correctness of the frames is checked. If the frames are not temporally correct, frames are removed to preserve the correct order and to permit the decoder to properly decode the frames as shown in step 1204.

If an end of sequence code is not provided at the end of a video sequence, the decoder can improperly decode a video sequence based on information in frames of a preceding video sequence. As shown in FIGS. 3a and 3b, a video sequence should end with a sequence_end_code 320. The sequence_end_code 320 is specified by MPEG as 000001B7 hex. As shown in steps 1206 and 1208, any frames following a sequence_end_code will be deleted. The provision of such a sequence_end_code at the very end of the video sequence facilitates the back-to-back decoding of two distinct programs (e.g., commercial advertisements).

Further, a video sequence (as transmitted) should end with a B-Picture frame, which should be the last of adjacent B-Picture frames just temporally before an I-Picture or P-Picture frame. (See e.g., frame sequence 1604 of FIG. 16.) This is because a B-Picture frame needs a next frame for decoding. Thus, any I-Picture or P-Picture frames immediately preceding an end_of_sequence code 320 are deleted.

Figure 13:
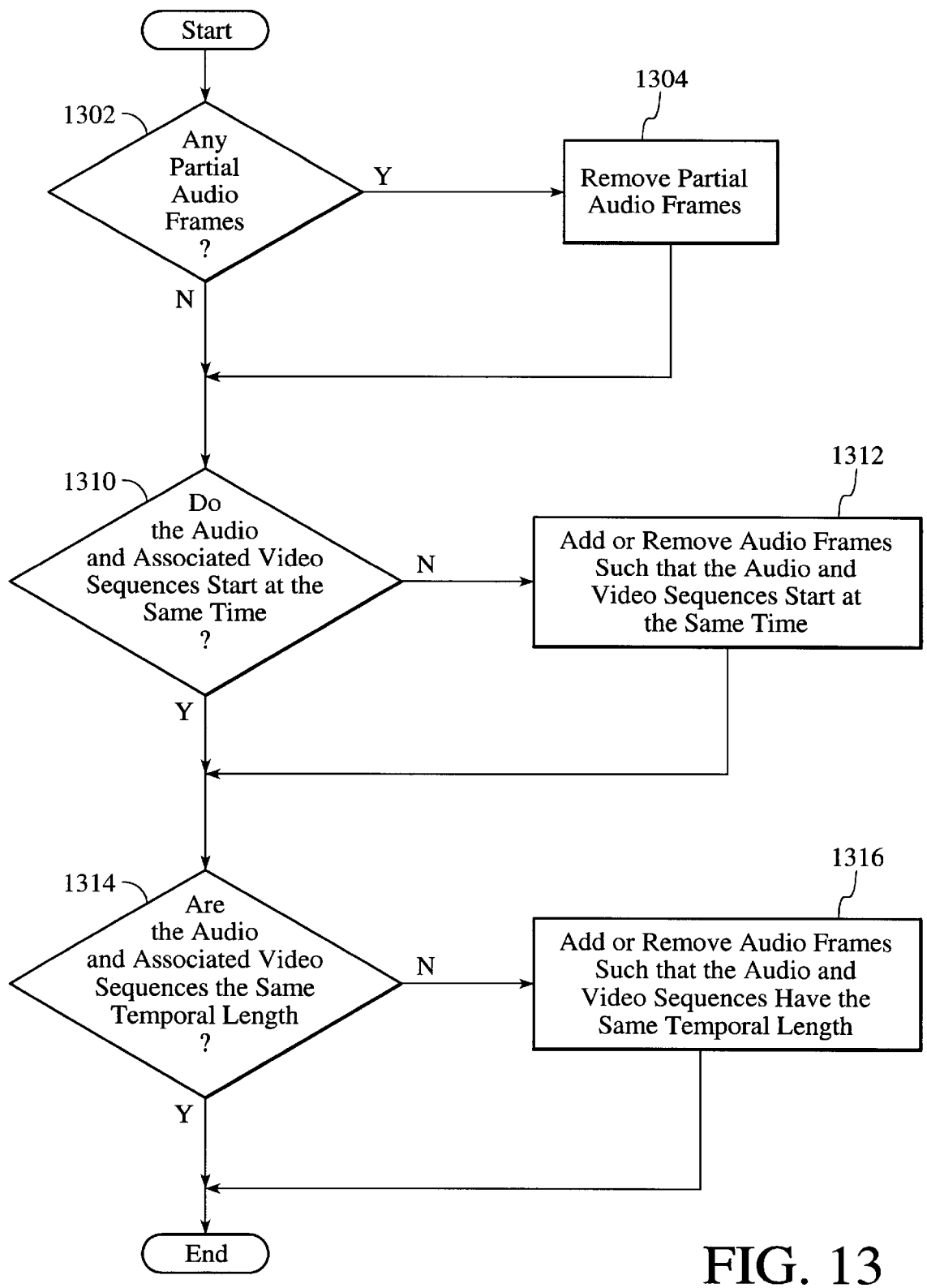
FIG. 13 is a flow diagram illustrating the step, used in the method of the present invention, of cleaning up the audio stream.

FIG. 13 is a flow diagram showing a process for "cleaning up" the audio stream. First, as shown in step 1302, whether any partial audio frames exist is determined. The audio frame contains a length value. If there is enough data available to wholly contain the audio frame, it assumed that the whole audio frame is there. If any partial audio frames exist, they are removed as shown in step 1304.

Next, as shown in step 1310, whether the audio sequence starts at the same time as the corresponding video sequence is determined. This is done by comparing the program time stamp (or PTS) of the first video frame with that of the first audio frame. Since each video frame represents 33 ms of video while each audio frame represents 24 ms of audio, if the program time stamps (PTSs) are within 12 ms of each other, they are considered to start at the same time. If the audio sequence does not start at the same time as (or within 12 ms of) the corresponding video sequence, audio frames are added or removed as shown in step 1312 until it does.

Finally, as shown in step 1314, whether the audio sequence has the same temporal length as its associated video sequence is checked. This can be done by comparing the temporal time stamps of the audio and video frames at the end of the audio and video sequences, respectively. As shown in step 1316, if the temporal length of the audio sequence does not match that of its associated video sequence (or is not within a predetermined time of that of its associated video sequence), audio frames are added or removed until the temporal lengths match.

As shown in step 1022 of FIG. 10, after the video and audio streams are "cleaned up" as described above, the private data packet(s) is updated. For example, the video frame count is modified to reflect any video frames added or deleted.

Figure 15:
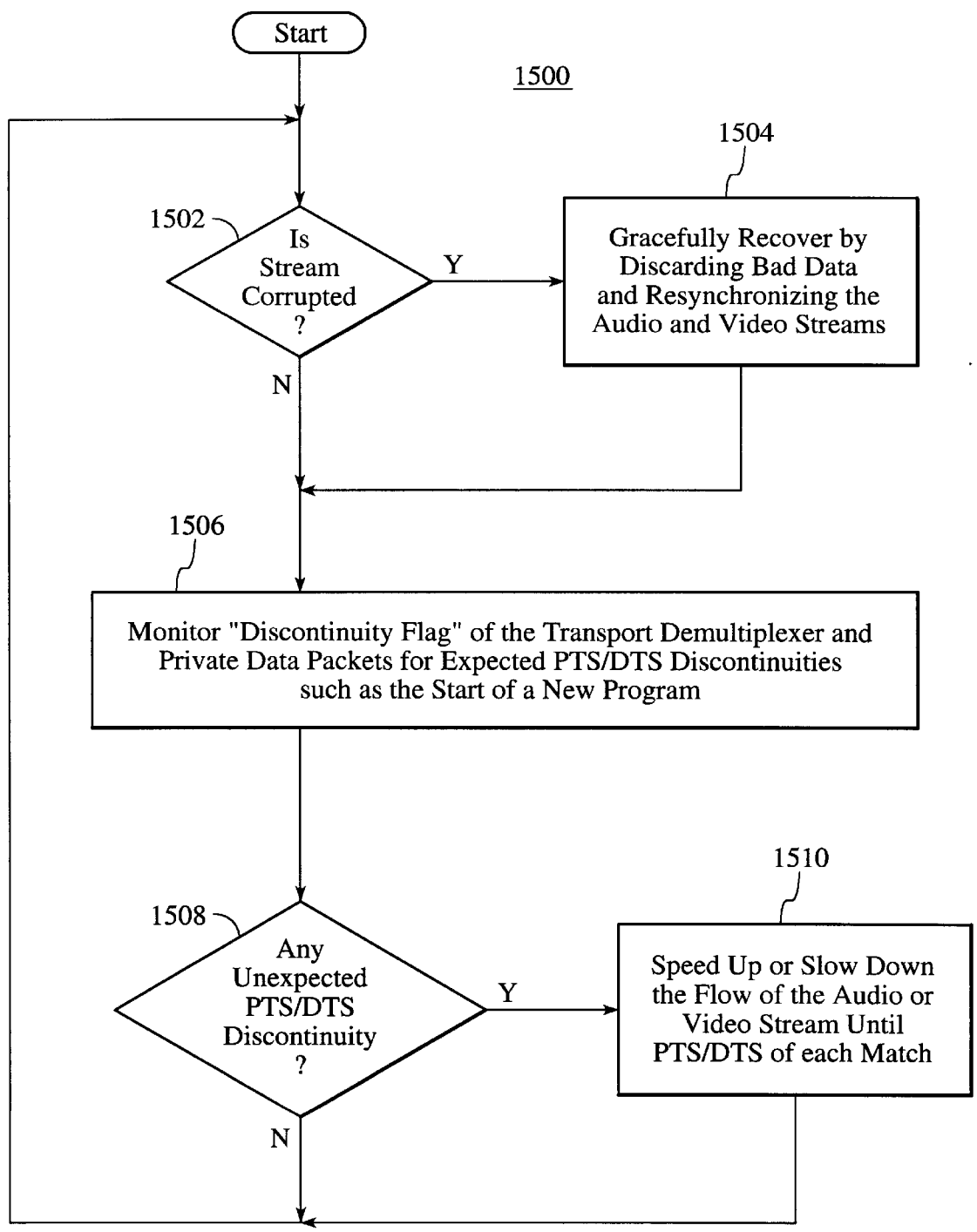
FIG. 15 is a flow diagram of functions performed by a decoder of a playback card in the system of the present invention to facilitate the back-to-back decoding of programs.

In the system of the present invention for decoding programs back-to-back, the decoder at each of the NxM playback cards 810 should perform the following functions. Referring to FIG. 15, as shown in step 1502, first the decoder looks for corrupted streams by monitoring the PTS/DTS field 214 of the PES packet(s) 200. As shown in step 1504, if a stream is corrupted, the decoder will recover from errors by discarding bad data and trying to resynchronize the video and audio streams. Next, as shown in step 1506, discontinuity indicators are monitored such that upcoming discontinuities (due to, e.g., the start of a new program) in the PTS/DTS field 214 of the PES packet(s) 200 can be anticipated. This is clone by checking a discontinuity flag of a transport demultiplexer of a playback card 810 which is set when the discontinuity indicator field 126 of a transport stream packet header 102 is set to "1" or by checking the private data packet generated by the preprocessor 922. As shown in steps 1508 and 1510, if an unanticipated discontinuity occurs in the PTS/DTS field 214, the video or audio streams are sped up or slowed down with respect to one another until the PTS/DTS 214 of the video and audio frames match.

Thus, the method and device of the present invention advantageously permit more than one program to be played (i.e., decoded) back-to-back.

What is claimed is:

1. A method for preprocessing multiplexed streams of packets of packetized, encoded, audio and video sequences such that an audio decoder can decode the encoded audio sequence to produce an audio sequence and a video decoder can, without being reset, decode the encoded video sequence to produce a video sequence, the method including the steps of:

a) verifying that a multiplexed stream complies with an encoding standard for audio and video data;
   b) preprocessing packets of the packetized, encoded, video sequence such that no video artifacts are produced when the video decoder decodes another encoded video sequence adjacent to the encoded video sequence; and
   c) preprocessing the packets of packetized, encoded, audio data sequence such that a start time of the audio sequence is within a first predetermined time of a start time of the video sequence and a temporal length of the audio sequence is within a second predetermined time of a temporal length of the video sequence.

2. A method for preprocessing multiplexed streams of packets of packetized, encoded, audio and video sequences such that an audio decoder can decode the encoded audio sequence to produce an audio sequence and a video decoder can, without being reset, decode the encoded video sequence to produce a video sequence, the method including the steps of:

a) verifying that a multiplexed stream complies with an encoding standard for audio and video data; and
   b) preprocessing packets of the packetized, encoded, video sequence such that no video artifacts are produced when the video decoder decodes another encoded video sequence adjacent to the encoded video sequence, wherein the step of preprocessing the packets of packetized, encoded, video sequence includes the sub-steps of:
      i) deleting any video frames that cannot be decoded if video frames of the video sequence are not temporally correct; and
      ii) deleting any video frames following a code indicating an end of the encoded video sequence.

3. The method of claim 1 wherein the step of preprocessing the packets of the packetized, encoded, audio sequence includes sub-steps of:

i) removing any partial audio frames;

ii) adjusting the number of audio frames, if necessary, such that the start times of the audio and video sequences are within the first predetermined time; and iii) adjusting the number of audio frames, if necessary, such that the temporal lengths of the audio and video sequences are within the second predetermined time.

4. A method for preprocessing files including multiplexed streams of packets of packetized, compressed, audio and video sequences such that a video decoder can, without being reset, decode packets of the packetized, compressed, video sequence immediately following packets of another packetized, compressed, video sequence, the method comprising steps of:

a) verifying that a file complies with a compression standard;

b) adding a private data packet to the file;

c) remapping packet identifiers of the packets of packetized, compressed, audio and video sequences;

d) determining whether the packets of the packetized, compressed, video sequence pass a first set of tests; and e) deleting selected ones of frames of the compressed video sequence if the packets of the packetized, compressed, video sequence were not determined to have passed the first set of tests in step (d).

5. The method of claim 4 further comprising steps of:

f) determining whether packets of the packetized, compressed, audio sequence, corresponding to the compressed video sequence, pass a second set of tests; and g) adjusting a number of frames the compressed audio sequence if the packets of the packetized, compressed, audio sequence were not determined to have passed the second set of tests in step (f).

6. The method of claim 4 wherein the compressed audio and video sequences have been compressed in accordance with an MPEG, Motion Pictures Expert Group, standard, and wherein the step of verifying includes at least one sub-step selected from a group consisting of:

i) determining whether the file has a predetermined number of sync bytes located 188 bytes apart;

ii) determining whether a first packet of a multiplexed stream has a program clock reference, PCR, discontinuity flag set;

iii) determining whether presentation time stamps, PTS and DTS, fields exist before the compressed video sequence;

iv) determining whether a PTS field exists before the compressed audio sequence;

v) determining whether the compressed video sequence begins with a sequence header;

vi) determining whether picture data of the video sequence starts with an I-Picture frame; and vii) determining whether a first group-of-pictures of the compressed video sequence is closed.

7. The method of claim 4 wherein, in the step of adding a private data packet to the file, the private data packet contains at least one of (a) a source ID field, (b) a bit rate field, (c) a video frame count, and (d) a version field.

8. The method of claim 4 wherein, in the step of adding a private data packet to the file, the private data packet contains a bit rate field and a video frame count.

9. The method of claim 4 wherein the step of determining whether the packets of the packetized, compressed, video sequence pass the first set of tests includes sub-steps of:

i) determining whether frames of compressed video sequence are temporally correct; and ii) determining whether any frames of the video sequence follow a code which indicates an end of the compressed video sequence.

10. The method of claim 9 wherein the step of deleting selected ones of frames of the compressed video sequence if the packets of packetized, compressed, video sequence were not determined to have passed the first set of tests in step (d) includes sub-steps of:

i) deleting frames of video data from the compressed video sequence until temporal correctness is restored; and ii) deleting frames of video data from the compressed video sequence following the code.

11. The method of claim 5 wherein the step of determining whether the packets of the packetized, compressed, audio sequence pass the second set of tests includes sub-steps of:

i) determining whether any partial audio frames exist in the compressed audio sequence;

ii) determining whether the audio and video sequences start within a first predetermined time; and ii) determining whether the audio sequence has a temporal length within a second predetermined time of a temporal length of the video sequence.

12. The method of claim 11 wherein the step of deleting selected ones of frames of the compressed audio sequence if the packets of the packetized, compressed, audio sequence were not determined to have passed the second set of tests in step (f) includes sub-steps of:

i) removing any partial audio frames in the compressed audio sequence;

ii) adjusting the number of audio frames in the compressed audio sequence until the start time of the audio sequence is within the first predetermined time of the start time of the video sequence; and iii) adjusting the number of audio frames in the compressed audio sequence until the temporal length of the audio sequence is within the second predetermined time of the video sequence.

13. The method of claim 4 further comprising a step of updating the private data packet.

14. The method of claim 7 further comprising a step of updating the private data packet by modifying the video frame count to reflect any video frames deleted from the compressed video sequence.

15. A device for converting a transport stream file of MPEG encoded audio and video data to a preprocessed transport stream file of MPEG encoded audio and video data such that a video decoder can decode two consecutive preprocessed streams of the MPEG encoded video data without being reset, the device including:

a) a storage device for storing transport stream files and preprocessed transport stream files;

b) a program storage device for storing a sequence of instructions;

c) a controller for executing the sequence of instructions and controlling access to the transport stream files and the preprocessed transport stream files in the storage device;

d) a preprocessor for, under control of the controller, reading a transport stream file from the storage device, converting the read transport stream file into a preprocessed transport stream file, and writing the preprocessed transport stream file to the storage device;

e) a buffer memory for reading a preprocessed transport stream file from the storage device under control of the controller and buffering the read preprocessed transport stream file; and f) an input/output interface for formatting the preprocessed transport stream buffered in the buffer memory for output to the decoder.

16. The device of claim 15 wherein the input/output interface is a SCSI-2 fast and wide interface.

17. The device of claim 15 further comprising a communications network arranged between the input/output interface of the device and the decoder.

* * * * *